United States Patent
Nakagawa et al.

[11] Patent Number: 5,805,222
[45] Date of Patent: Sep. 8, 1998

[54] VIDEO CODING APPARATUS

[75] Inventors: Akira Nakagawa; Kimihiko Kazui; Eishi Morimatsu, all of Kawasaki; Takahiro Shimizu, Yokohama, all of Japan

[73] Assignee: Fujitsu Limited, Kawasaki, Japan

[21] Appl. No.: 743,171

[22] Filed: Nov. 4, 1996

[30] Foreign Application Priority Data

Mar. 29, 1996 [JP] Japan .................................. 8-075605

[51] Int. Cl.⁶ .................................................. H04N 7/50
[52] U.S. Cl. .......................................... 348/401; 348/405
[58] Field of Search .................................. 348/401, 405, 348/412, 415, 441, 445

[56] References Cited

U.S. PATENT DOCUMENTS 5,477,272  12/1995  Zhang ...................................... 348/407
5,565,925  10/1996  Kinouchi ................................. 348/405
5,640,198   6/1997  Makiyama ............................... 348/441

OTHER PUBLICATIONS

Patent Abstracts of Japan, Appln. No. 07–030901, Jan. 31, 1995.

*Primary Examiner*—Howard W. Britton
*Attorney, Agent, or Firm*—Staas & Halsey

[57] ABSTRACT

A video coding apparatus for performing predictive coding of digital video input signals. The apparatus employs a resolution selection controller that selects picture resolution to be used in coding of a source picture of a current frame, according to coding information in a previous frame. Such coding information includes quantizer step size, amount of coded data, and buffer occupancy. Before being supplied to a coding unit, the source picture is sent to a resolution converter, where the source picture is converted to gain the resolution selected by said resolution selection controller. The coding unit then encodes the source picture with the selected picture resolution.

9 Claims, 3 Drawing Sheets

VIDEO CODING APPARATUS

BACKGROUND OF THE INVENTION

1. Field of the Invention

The present invention relates to video coding apparatus, and more specifically, to a video coding apparatus that performs predictive coding of digital video signals.

2. Description of the Related Art

The ITU-T standard H.261 and the ISO standards MPEG-1 and MPEG-2, for example, are well-acknowledged international standards for motion picture coding techniques, which employ hybrid coding algorithms. In those standard video coding schemes, the coding process proceeds as: (1) a source picture is divided into blocks of pixels, (2) orthogonal transformation (e.g., discrete cosine transformation) and motion compensation are applied independently on each block, and (3) quantized video data is compressed by entropy coding.

When a motion of considerable magnitude or a full scene transition happened in the middle of a sequence of video frames, the above-described hybrid video coding techniques may suffer from an overwhelming amount of coded frame data that exceeds a standard level allowed for each frame. In such a case, the coder will forcibly reduce the amount of coded data in an attempt to regulate it at the standard level. This will cause extreme degradation of image quality and/or too coarse frame sub-sampling (or a drop of frame update rate), thus resulting in unacceptably poor pictures when reconstructed at receiving ends.

A video coding system aiming at avoidance of the above problem is disclosed in Japanese Patent Laid-open Publication No. 7-30901 (1995), for instance. In the system proposed in this publication, the coder reduces resolution of input frame signals to regulate the amount of coded frame data when a full scene transition or a massive motion has happened in the middle of a sequence of video frames. Such data reduction strategy is based on the fact that reducing the picture resolution can maintain the perceptual quality of decoded pictures better than raising quantizer step size. The prior-art video coding system employs motion vector computing means for computing motion vectors indicating inter-frame displacement of each block. The coding system then calculates the average magnitude of the obtained motion vectors in an entire frame, and selects an appropriate resolution according to the calculated average magnitude of motion vectors. In this way, the coding system reduces the amount of coded data by reducing the resolution of the video signal, when a motion of large magnitude is observed between two consecutive frames.

The above-described prior-art coding system, however, has the following problems.

First, the prior-art system may conduct an unnecessary reduction of picture resolution due to incorrect interpretation of motion vector magnitude. The average magnitude of motion vectors in a frame is not always proportional to the total amount of coded data. Assume here that the view of a camera is simply moving in a fixed direction as in panning. The motion vectors computed in such a situation will indicate a large amount of motion, but the amount of data actually produced by the coder can be relatively small, because the motion prediction algorithm implemented in the coder works efficiently and the computed motion vectors tend to have uniform values. Therefore, it must be possible in this case to encode and transmit video frames without reducing their resolution and to restore the original quality at the receiving end. The prior-art coding system, however, may needlessly lower the resolution, simply because of large average magnitude of motion vectors.

Second, the prior-art coding system conducts an unnecessary reduction of picture resolution due to indifference to buffer occupancy. To regulate the rate of bit stream to be sent to the receiving end, the coding system employs buffer storage which temporarily stores coded data. When buffer occupancy (i.e., the amount of coded data as part of the buffer storage capacity) is smaller than a predetermined value, the buffer storage can potentially accept a larger amount of coded data than usual. Even in such cases, the conventional system will needlessly lower the resolution due to the presence of large average magnitude of motion vectors, thus resulting in degradation of picture quality.

Third, the prior-art system must execute each coding process faster than normal pipelined systems. To provide necessary performance, most video coding systems take pipeline architecture, where multiple blocks are processed concurrently in different stages. Assume here that each block data should pass through three steps of: motion vector calculation, prediction error calculation, and orthogonal transformation. In the first step, a motion vector of a first block is calculated. In the next step, the processed first block is subjected to the prediction error calculation, and simultaneously, a second block is applied to the motion vector calculation. In the third step, the orthogonal transformation is applied to the first block, prediction errors of the second block are calculated, and motion vector of the third block is calculated. In this way, the pipelined coding systems can apply a plurality of processes, which should be executed in a sequential manner, to different blocks at a time, thus providing a high-level throughput as a whole. In the prior-art coding system, on the other hand, the motion vector calculation means calculates motion vectors, and upon completion of the vector calculation for the entire frame, the average vector magnitude is calculated to determine the picture resolution. That is, the picture resolution cannot be defined until the motion vector calculation is finished, and the subsequent processes such as prediction error calculation, orthogonal transformation, quantization, inverse quantization, and inverse orthogonal transformation, cannot start until the picture resolution is defined. Therefore, the prior-art system must execute each process faster than normal pipelined systems in order to finish the frame coding within a fixed cycle time.

SUMMARY OF THE INVENTION

Taking the above into consideration, an object of the present invention is to provide a video coding apparatus which provides proper and prompt control of the resolution of source pictures to regulate the amount of coded data at an appropriate level.

To accomplish the above object, according to the present invention, there is provided a video coding apparatus for performing predictive coding of digital video input signals. The apparatus comprises resolution selection control means for selecting picture resolution to be used in coding of a source picture of a current frame based on coding information in a previous frame, where the coding information includes quantizer step size, amount of coded data, and buffer occupancy. The apparatus further comprises resolution conversion means for converting resolution of the source picture to the picture resolution selected by the resolution selection control means and coding means for coding the source picture whose resolution is converted by the resolution conversion means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Two embodiments of the present invention will be described below with reference to the accompanying drawings.

At the outset, the principle of a video coding system of a first embodiment will be explained with reference to FIG. 1. The video coding system of the first embodiment comprises resolution selection control means 1 for selecting picture resolution to be used in coding of a source picture of a current frame based on coding information in a previous frame, where the coding information includes quantizer step size, amount of coded data, and buffer occupancy. The apparatus further comprises resolution conversion means 2 for converting resolution of the source picture to the picture resolution selected by the resolution selection control means 1 and coding means 3 for coding the source picture whose resolution is converted by the resolution conversion means 2.

When the coding of a frame is finished, some resultant information related to the coded frame becomes available, which includes at least quantizer step size, amount of coded data, and buffer occupancy. Such coding information indicates the characteristics of that frame to some extent. In general, the characteristics of pictures change gradually with the passage of time, but it is also true that two consecutive frames have a good correlation in their characteristics. Therefore, it is possible to predict the characteristics of the current frame that is in process of coding, using the coding information of the previous frame. In other words, by examining the coding information of the previous frame, the system can estimate whether the current frame will be coded successfully or not, in terms of the following criteria: (1) the amount of the coded data must be within a target amount, and (2) the picture, when decoded, must satisfy a standard quality level.

The present invention applies the above-described ideas to a video coding system. According to the present invention, the coding system estimates the amount of the coded data and the quality of decoded image, and uses this estimation to determine the picture resolution. That is, when it is estimated that those conditions cannot be satisfied, the system reduces the picture resolution of input video (i.e., reduces the number of pixels to be coded), so that the total amount of coded data will decrease. In this way, the coding system generates a digital video bit stream that will smoothly reproduce the original motion with less frequent frame drops when it is decoded.

Figure 1:
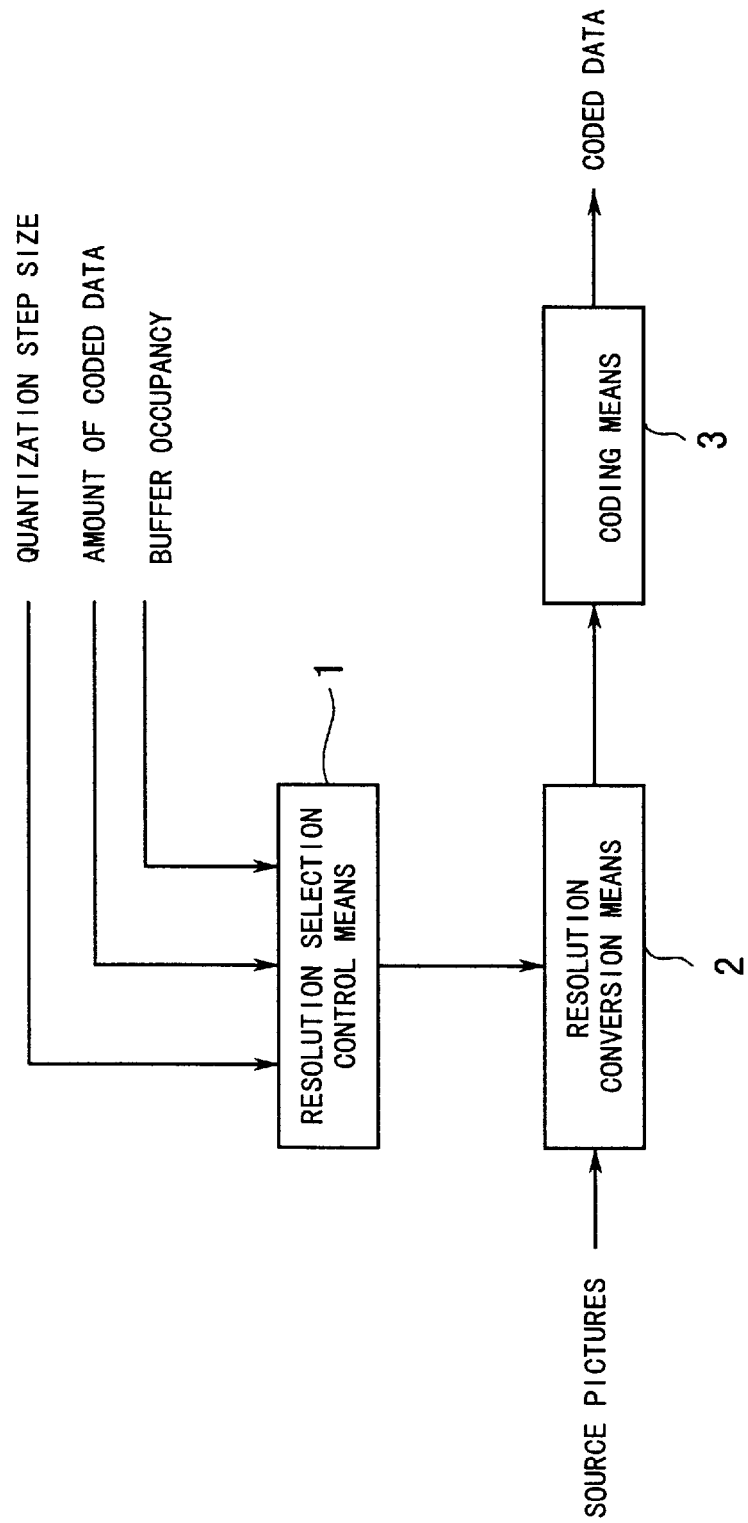
FIG. 1 is a conceptual view of the present invention.

More specifically, the video coding system configured as shown in FIG. 1 will operate as follows. The resolution selection control means 1 receives from the coding means 3 the quantizer step size, the amount of coded data, and the buffer occupancy in the previous frame coding process. Based on those three factors, the resolution selection control means 1 estimates whether the aforementioned conditions will be met or not in the current frame coding process, thereby selecting a picture resolution suitable for a source picture, or input image, of the current frame.

The source picture is processed in the resolution conversion means 2 before reaching the coding means 3. The resolution conversion means 2 changes the resolution of the source picture to the picture resolution selected by the resolution selection control means 1. The coding means 3 encodes the source picture with that selected resolution.

In this way, the present invention enables the next picture resolution to be determined right after the previous frame is coded. Unlike the prior-art system, the video coding system of the present invention has no need to wait for the result of averaging of the motion vectors, and thus it can determine the source picture resolution in a prompt and proper manner as well as regulating the amount of coded data at an appropriate level. Thanks to the readiness of the picture resolution, the system can be fully configured with a pipeline scheme, without speeding up each stage thereof.

Figure 2:
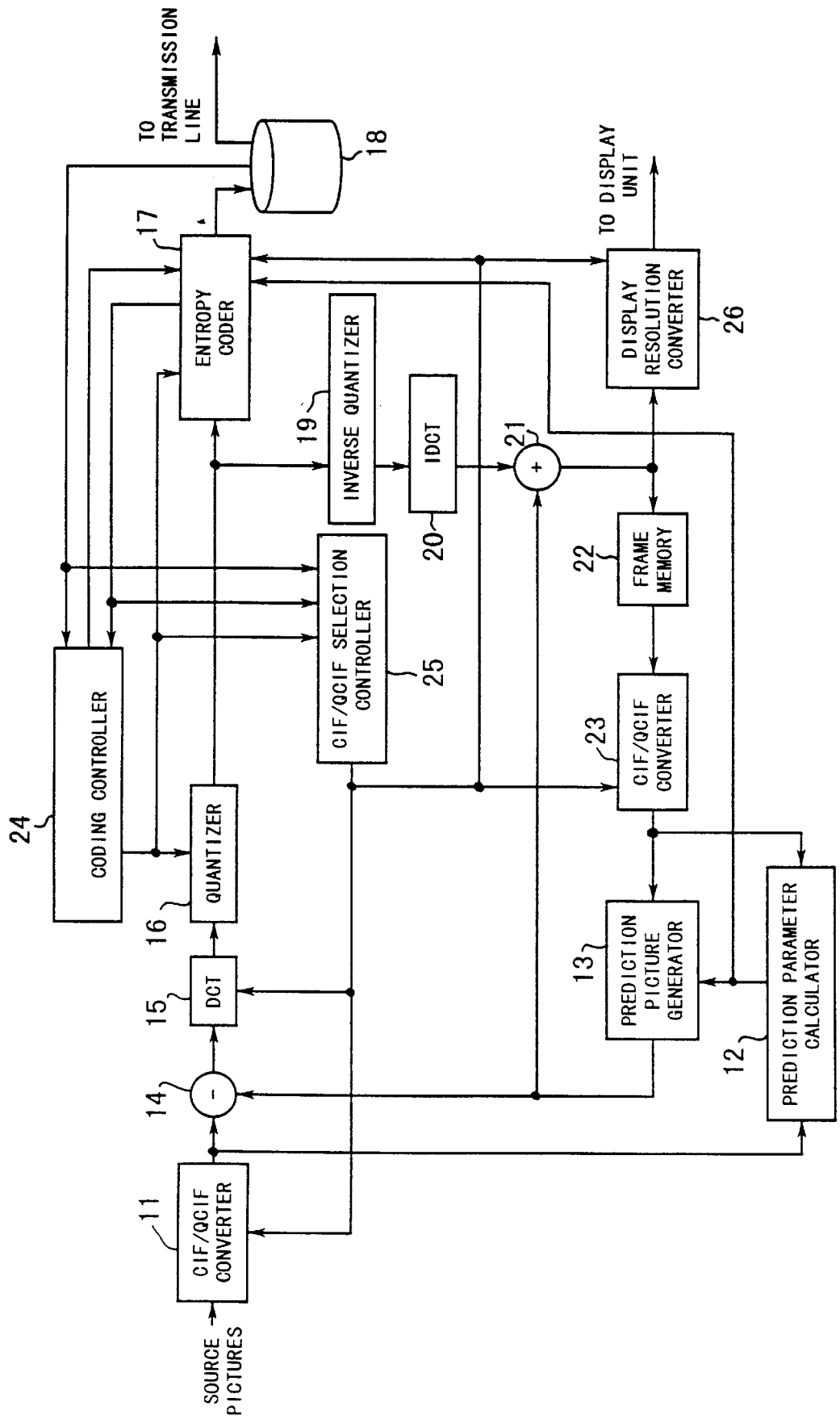
FIG. 2 is a block diagram showing the structure of a first embodiment.

FIG. 2 is a block diagram showing the detailed structure of the first embodiment. Note that such a video coding system, in reality, must have some additional data paths and switches for bypassing some functional elements for interframe coding (i.e., the system only performs intraframe coding). However, since the present invention is specifically related to a predictive video coding apparatus, FIG. 2 (and also FIG. 3) focuses on the structural arrangement for an interframe coding scheme, for simplicity.

This first embodiment has the following relationship with the basic structure of the present invention shown in its conceptual view. The resolution selection control means 1 in FIG. 1 corresponds to a CIF/QCIF selection controller 25 in FIG. 2, and similarly, the resolution conversion means 2 in FIG. 1 corresponds to a CIF/QCIF converter 11 in FIG. 2. The coding means 3 is implemented as a combination of a prediction parameter calculator 12, a prediction error calculator 14, a DCT processor 15, a quantizer 16, an entropy coder 17, and a coding controller 24.

The first embodiment adopts a coding scheme of the ITU-T standard H.261 for teleconferencing coding. H.261 allows only two picture formats: common intermediate format (CIF) and quarter-CIF (QCIF). The CIF picture resolution is defined as 352×288 pixels for luminance components of a picture, while that of QCIF is 176×144 pixels. For efficiency of computation, H.261 adopts block-based algorithms, in which each picture is partitioned into blocks of 8×8 pixels.

In operation of the video coding system of FIG. 2, a CIF/QCIF converter 11 converts the CIF picture resolution of source pictures to the QCIF picture resolution according to instructions from a CIF/QCIF selection controller 25 (described later). The output of the CIF/QCIF converter 11 is sent to a prediction parameter calculator 12 and prediction error calculator 14. A reconstructed (or decoded) picture of the previous frame stored in a frame memory 22 is also sent to the prediction parameter calculator 12 via a CIF/QCIF converter 23. Full details of the frame memory 22 and CIF/QCIF converter 23 will be described later. Comparing the source picture of the current frame with the reconstructed picture of the previous frame on a block-by-block basis, the prediction parameter calculator 12 computes motion vectors of the current frame. Note that the pictures of the two consecutive frames are configured to have the same resolution for easy comparison, as described in detail later on. The motion vectors obtained by the prediction parameter calculator 12 are supplied to the prediction picture generator 13 and an entropy coder 17. The prediction picture generator 13 receives, in addition to the motion vectors, a decoded image of the previous frame from the frame memory 22 via the CIF/QCIF converter 23. Based on the decoded image of the previous frame and the motion vectors, the prediction picture generator 13 produces a prediction picture of the current frame and sends it to a prediction error calculator 14 and a reconstructed picture generator 21.

The prediction error calculator 14 produces a prediction error signal by calculating differences between the current frame picture provided by the CIF/QCIF converter 11 and the prediction picture provided by the prediction picture generator 13. The produced prediction error signal is then sent to a DCT processor 15. The two pictures under comparison are configured to have the same resolution as described in detail later on. In order to reduce the spatial redundancy within a block, the DCT processor 15 applies a discrete cosine transformation (DCT) to the prediction error signal of each block, thus obtaining transform coefficients. A quantizer 16 disposed next to the DCT processor 15 quantizes the transform coefficients of each block with a quantizer step size specified by a coding controller 24. The quantized transform coefficients are then entered to an entropy coder 17 to perform data compression with an entropy coding algorithm. More specifically, the entropy coder 17 receives the quantized transform coefficients from the quantizer 16, the motion vectors from the prediction parameter calculator 12, the quantizer step size and other predictive coding system information (e.g., interframe or intraframe coding mode) from the coding controller 24, and the picture resolution from the CIF/QCIF selection controller 25. The entropy coder 17 then assigns different codes to the combinations of those received data and stores the coded data to a code buffer 18. The code buffer 18 serves as temporary storage of the coded data which will be sent out to the transmission line in the form of bit stream at a constant transfer rate.

The quantized transform coefficients produced by the quantizer 16 are also directed to the inverse quantizer 19 for dequantization, or inverse quantization. They are then directed to an inverse discrete cosine transformation (IDCT) by an IDCT processor 20 to reproduce the prediction error signal. A reconstructed picture generator 21 reconstructs a picture by adding the prediction picture produced by the prediction picture generator 13 and the prediction error signal from the IDCT processor 20. This reconstructed picture shows the picture of the current frame, but it is not exactly the same as the original source picture because some detailed graphical information is lost in the coding process. The reconstructed picture generator 21 saves the reconstructed picture to a frame memory 22 for use in the next frame. In the above summation process, the resolution of the predicted picture is adjusted to the resolution of pictures from which the prediction error signal is derived, as described in detail later on.

The coding controller 24 is reported by the entropy coder 17 about the amount of coded data produced through the entropy coding. The coding controller 24 also receives from the code buffer 18 the buffer occupancy information, which indicates how much data is occupying the capacity of the code buffer 18. Based on those information, the coding controller 24 determines the quantizer step size and distributes it to the quantizer 16, inverse quantizer 19, and entropy coder 17, although the signal flow to the inverse quantizer 19 is omitted in FIG. 2.

The CIF/QCIF selection controller 25 receives the quantizer step size for each block in the previous frame from the coding controller 24, the amount of the coded data of the previous frame from the entropy coder 17, and the buffer occupancy at from the code buffer 18. Based on the received information, the CIF/QCIF selection controller 25 determines which picture resolution should be used in coding of the current frame. Full details of this decision process will be described later as a separate topic. The determined picture resolution is distributed to the CIF/QCIF converter 11, CIF/QCIF converter 23, and entropy coder 17, and further to the DCT processor 15 and display resolution converter 26.

When the CIF/QCIF selection controller 25 decided to use the CIF resolution, or the high resolution, the CIF/QCIF converter 11 simply forwards the source picture, which has the CIF resolution, as is to the succeeding stages. The CIF/QCIF converter 23 simply outputs a reconstructed picture retrieved from the frame memory 22 if it has the CIF resolution, or converts the retrieved picture to the CIF resolution if it has the QCIF resolution. As a result, the signals to be processed in the prediction parameter calculator 12, prediction error calculator 14, and reconstructed picture generator 21 are unified to the CIF in terms of the picture resolution.

On the other hand, when the CIF/QCIF selection controller 25 has decided to use the QCIF resolution, or the low resolution, the CIF/QCIF converter 11 converts the CIF source pictures into QCIF pictures. The CIF/QCIF converter 23 retrieves the reconstructed picture of the previous frame from the frame memory 22 and converts it to the QCIF picture if it is of the CIF resolution. If the retrieved picture has the QCIF resolution, the CIF/QCIF converter 23 will simply output that picture. As a result, the signals to be processed in the prediction parameter calculator 12, prediction error calculator 14, and reconstructed picture generator 21 will be unified to the QCIF in terms of the picture resolution.

The CIF/QCIF selection controller 25 instructs the picture resolution also to the DCT processor 15 and display resolution converter 26. The usage of the picture resolution in those two functional blocks will be described right after the following explanation regarding how the CIF/QCIF selection controller 25 determines the picture resolution.

The CIF/QCIF selection controller 25 uses several parameters previously defined for the video coding process. $QP_{TH1}$ is the largest (or coarsest) quantizer step size that is allowed when performing the coding in a high resolution mode, namely, when the CIF resolution is selected. Likewise, $QP_{TH2}$ is the smallest (or finest) quantizer step size that is allowed in a low resolution mode, or the QCIF resolution. $B_{target1}$ is defined as a target amount of coded data per frame in the CIF resolution, and $B_{target2}$ in the QCIF resolution. The CIF/QCIF selection controller 25 calculates a product $QP_{i-1} \cdot B_{i-1}$, where $QP_{i-1}$ is an average quantizer step size for all blocks in the previous frame, and $B_{i-1}$ is the amount of coded data actually produced in the previous frame. A symbol $\Delta$ represents buffer occupancy of the storage unit 18 when the previous frame is finished.

Assume here that the CIF resolution was taken in the previous frame. When the buffer occupancy $\Delta$ is larger than a predetermined standard value $\Delta_{TH1}$ and the product $QP_{i-1} \cdot B_{i-1}$ is larger than $QP_{TH1} \cdot B_{target1}$, the CIF/QCIF selection controller 25 will choose the QCIF resolution for coding the current frame.

Assume, in turn, that the QCIF resolution was taken in the previous frame. When the buffer occupancy Δ is smaller than another predetermined standard value $\Delta_{TH2}$ and the product $QP_{i-1} \cdot B_{i-1}$ is smaller than $QP_{TH2} \cdot B_{target2}$, the CIF/QCIF selection controller 25 will select the CIF resolution for coding the current frame.

In general, a smaller quantizer step size will cause a larger amount of coded data, and a larger step size will produce a smaller amount of coded data. Broadly speaking, the amount of coded data is inversely proportional to the average quantizer step size of all blocks constituting a source picture. In other words, the product of those two factors is near-constant when source pictures are given in the same resolution. This product serves as a good index showing the characteristics of source pictures, particularly in the aspect of video coding control, as long as the video coding system is running with consistent system parameters including the picture resolution. Because the characteristics of video pictures smoothly change with time in general, the above-described product will not vary so much from one frame to the next frame, and this justifies, in most cases, the use of the product value in the previous frame as an estimate for the current frame that is to be processed from now.

The present invention originated in the above observation. In the case that the CIF resolution was selected in the previous frame, the buffer occupancy Δ larger than the predetermined standard value $\Delta_{TH1}$ implies that the code buffer 18 has little room. Also, the previous frame's product value $QP_{i-1} \cdot B_{i-1}$ exceeding the standard value $QP_{TH1} \cdot B_{target1}$ suggests that the current frame coding would cause an overflow of coded data if the previous resolution, CIF, was applied thereto without change. When such conditions are observed, the CIF/QCIF selection controller 25 chooses the QCIF resolution as the new picture resolution for coding the current frame. In turn, in the case that the QCIF resolution was selected in the previous frame, the buffer occupancy Δ smaller than the predetermined standard value $\Delta_{TH2}$ means that the code buffer 18 has room at a certain level. The previous frame's product value $QP_{i-1} \cdot B_{i-1}$ smaller than the standard value $QP_{TH2} \cdot B_{target2}$ indicates that the current frame coding would produce too little coded data if the previous resolution, QCIF, was continuously applied thereto without change. When such conditions are observed, the CIF/QCIF selection controller 25 chooses the CIF resolution for coding the current frame.

Unlike the prior-art coding system, the present invention does not require calculation of average magnitude of motion vectors. The present invention can quickly determine the picture resolution appropriate for the current frame, based on the coding information in the previous frame as explained above. Thus the coding system can regulate the amount of coded data at a proper level.

Meanwhile, the decoded video signal produced by the reconstructed picture generator 21 may have the CIF resolution in some cases and the QCIF resolution in other cases. When monitoring of the reconstructed pictures is needed, such inconsistency in picture resolution will cause a problem with a display unit (not shown in FIG. 2) which is normally designed to adapt only to a fixed resolution. A display resolution converter 26 solves this problem by adjusting the resolution to suit the display unit. That is, in accordance with the picture resolution selected by the CIF/QCIF selection controller 25, the display resolution converter 26 changes the resolution of the reconstructed pictures produced by the reconstructed picture generator 21, to satisfy the input signal requirement of the display unit.

Even if the resolution is increased from QCIF to CIF, the prediction picture will not change immediately to CIF, but it still has the QCIF resolution because the prediction is based on the reconstructed picture of the previous frame. Although CIF pictures generally include some high spatial frequency components to represent detailed images, QCIF pictures completely omit those components. Therefore, right after the CIF/QCIF converter 11 stopped conversion from CIF to QCIF, a rich CIF source picture will be predictive-coded in reference to a poor QCIF prediction picture, thus causing a sudden increase of coded data. As a result, the CIF/QCIF selection controller 25 may select QCIF again and it is likely to continue alternating the picture resolution from one to the other. To avoid such an oscillation, the DCT processor 15 will output only a limited number of transform coefficients at first and then gradually increase it, when the CIF/QCIF selection controller 25 changed the picture resolution from QCIF to CIF. More specifically, the DCT processor 15 first outputs the 4×4 coefficients only, which represent low-frequency components. Then it will gradually include other higher-frequency components such as 5×5, 6×6, and 7×7 coefficients, as long as the succeeding frames remain in the same CIF resolution. In this way, the DCT processor 15 increases the number of coefficients, from low-frequency components to high-frequency components, thus realizing a smooth change of picture resolution. This spectral selection method prevents the oscillation between CIF and QCIF from happening, as well as suppressing excessive increase of coded data.

Although the first embodiment uses only two resolutions, CIF and QCIF, the present invention can be applied to such a system that allows more resolutions to be selected. In that case, the coding system defines different standard quantizer step sizes and bit rates for the respective picture resolutions and controls the resolution of each frame by evaluating the previous coding results with reference to the product of a relevant quantizer step size and the target amount of coded data per frame.

Block-based coding schemes are known as excellent techniques that provide good performance in general, and the best efficiency is achieved when the picture resolution is an integer multiple of the block size. In a video coding system configured with a block-based coding unit, each block is separately processed no matter what picture resolution is taken, thus allowing the same set of entropy codes to be reused in different blocks. Therefore, it is preferable to select the width and height of a picture as being integer multiples of n-pixels, where n is the width and height of a block measured in pixels. That is, the horizontal size of a picture is defined as (L×n) pixels and the vertical size is selected as (M×n) pixels, where L and M are integers. With such picture dimensions, the coding system can efficiently process variously sized pictures by simply repeating (L×M) times of block-based coding operations.

Next, a second embodiment of the present invention will be described below.

Figure 3:
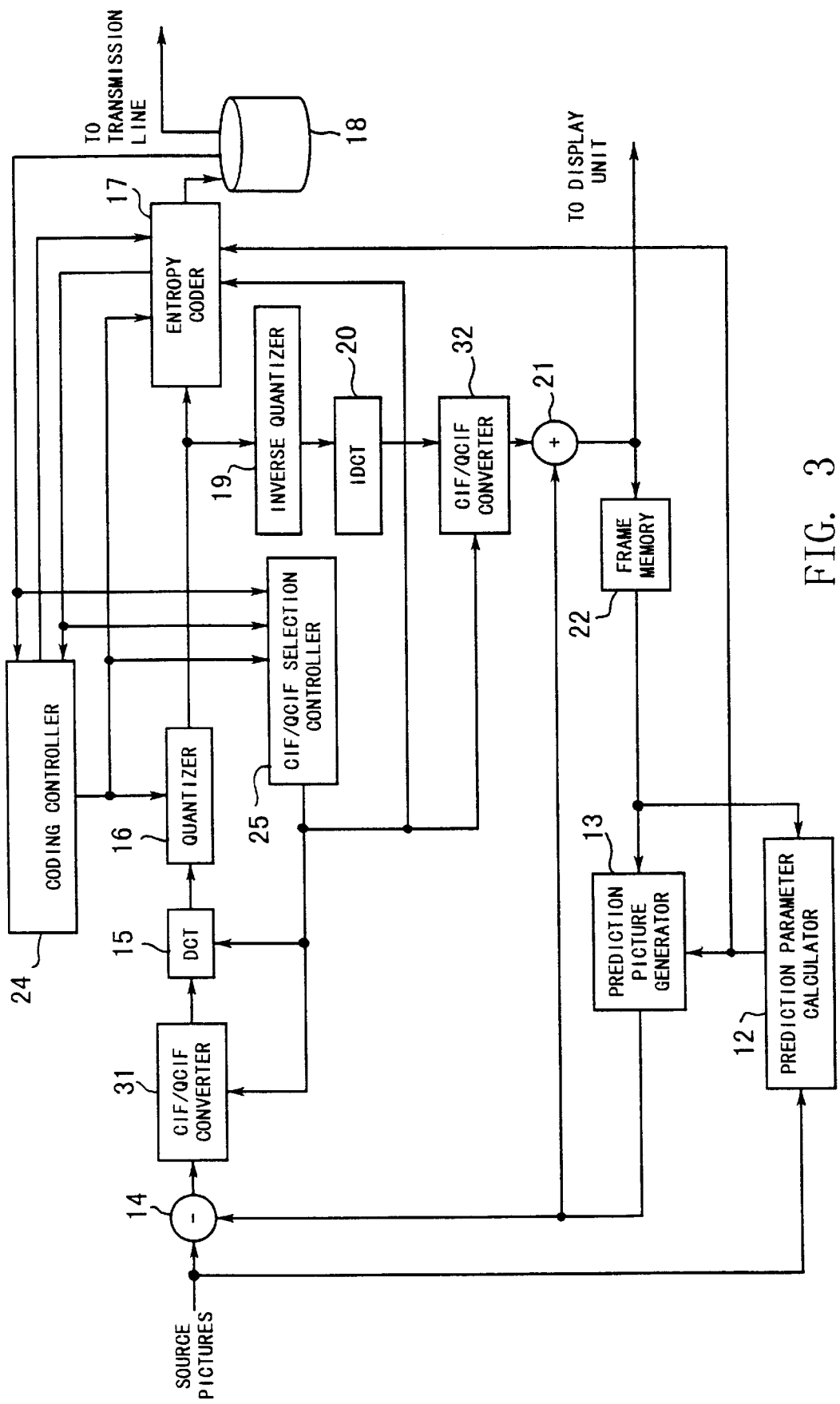
FIG. 3 is a block diagram showing the structure of a second embodiment.

FIG. 3 is a block diagram showing the structure of the second embodiment, which is basically the same as that of the first embodiment except for the locations of some functional elements for resolution conversion, such as a CIF/QCIF converter. The following description will focus on some distinctive points of the second embodiment, while maintaining consistent reference numerals for the common elements.

In the second embodiment, a CIF/QCIF converter 31 is disposed between the prediction error calculator 14 and DCT processor 15, and a QCIF/CIF converter 32 is located between the IDCT processor 20 and reconstructed picture generator 21. The CIF/QCIF converter 31 receives a prediction error signal from the prediction error calculator 14 for coding the current frame, and converts its CIF resolution to the QCIF resolution according to instructions from the CIF/QCIF selection controller 25. The QCIF/CIF converter 32, on the other hand, receives a decoded prediction error signal from the IDCT processor 20 and converts its QCIF resolution to the CIF resolution according to the instructions from the CIF/QCIF selection controller 25.

The CIF/QCIF selection controller 25 determines the picture resolution in the same way as in the first embodiment. When it selected, say, a high resolution, or CIF, the CIF/QCIF converter 31 forwards the received prediction error signal of the current frame to the DCT processor 15 without modification. Since a decoded prediction error signal appears with the CIF resolution in this case, the QCIF/CIF converter 32 simply feeds it to the reconstructed picture generator 21. When the CIF/QCIF selection controller 25 selected a low resolution, or QCIF, the CIF/QCIF converter 31 changes the resolution of the prediction error signal from CIF to QCIF. The QCIF/CIF converter 32 thus receives the decoded prediction error signal with the QCIF resolution, and in this case, it outputs the signal after converting its resolution to CIF.

The above-described structural arrangement unifies the resolution of pictures to be processed in the prediction parameter calculator 12, prediction error calculator 14, and reconstructed picture generator 21. Recall that those functional elements in the first embodiment should deal with both CIF and QCIF dimensions. Unlike such a first embodiment, the second embodiment allows them to process the pictures always in the high resolution of CIF dimensions. In spite of the insertion of resolution converters, such configuration in the second embodiment can provide better quality of decoded images in comparison with the first embodiment.

In addition to the advantage in picture quality, the second embodiment simplifies the functions provided by the following system constituents: the prediction parameter calculator 12, prediction picture generator 13, prediction error calculator 14, reconstructed picture generator 21, and frame memory 22. These elements are not required to alternately handle both CIF and QCIF formats but allowed to focus on CIF.

Further, the second embodiment does not require a display resolution converter unlike the first embodiment, since the pictures reconstructed by the reconstructed picture generator 21 has a fixed resolution, i.e., CIF. Therefore, it is possible to deliver the decoded video signals directly to the display unit.

The above discussion will be summarized as follows. According to the present invention, the picture resolution of the current frame is determined based on the quantizer step size and the amount of coded data in the previous frame coding, as well as in consideration of the buffer occupancy. The source picture of the current frame is converted to gain the determined resolution in advance of coding.

The present invention determines the resolution of the current frame immediately after the previous frame is processed. Unlike the conventional coding systems, there is no need to wait until an average magnitude of motion vectors for an entire frame is calculated. The system provides proper and prompt control of the resolution of source pictures, thus enabling the amount of coded data to be maintained at an appropriate level. The present invention also enables the system to be fully configured in a pipeline architecture, which provides enough performance without requiring enhancement of each stage of the coding process.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A video coding apparatus for performing predictive coding of digital video input signals, comprising:
    resolution selection control means for selecting picture resolution to be used in coding of a source picture of a current frame based on coding information in a previous frame, said coding information including quantizer step size, amount of coded data, and buffer occupancy;
    resolution conversion means for converting resolution of the source picture to the picture resolution selected by said resolution selection control means; and
    coding means for coding the source picture whose resolution is converted by said resolution conversion means.

2. A video coding apparatus according to claim 1, wherein said resolution selection control means selects the picture resolution to be used in coding of the source picture of the current frame further based on the picture resolution used in the previous frame.

3. A video coding apparatus according to claim 1, wherein
    said coding means comprises prediction error calculation means for obtaining a prediction error signal of the current frame by calculating difference between the source picture of the current frame and a predicted picture of the current frame, and
    said resolution conversion means is disposed next to said prediction error calculation means,
    the video coding apparatus further comprising
    resolution inverse-conversion means for inversely converting resolution of a decoded prediction error signal of the current frame, and
    picture reconstruction means, coupled to said resolution inverse-conversion means, for generating a reconstructed picture of the current frame by adding the decoded prediction error signal whose resolution is inversely converted by said resolution inverse-conversion means to the predicted picture of the current frame, the decoded prediction error signal and the predicted picture of the current frame having the same dimension as the resolution that the source picture originally has.

4. A video coding apparatus according to claim 1, wherein said coding means comprises
    orthogonal transformation means for applying an orthogonal transformation to the prediction error signal of the current frame and outputting transform coefficients, and
    control means for controlling said orthogonal transformation means so that output of high-frequency components in the transform coefficients will be suppressed right after the resolution of the source picture of the current frame is changed from a low resolution to a high resolution by said resolution conversion means.

5. A video coding apparatus according to claim 1, wherein said coding means comprises prediction error calculation means for obtaining a prediction error signal of the current frame by calculating difference between the source picture of the current frame whose resolution is converted by said resolution conversion means and a predicted picture of the current frame, the video coding apparatus further comprising picture reconstruction means for generating a reconstructed picture of the current frame by adding a decoded prediction error signal of the current frame to the predicted picture of the current frame, the decoded prediction error signal and the predicted picture of the current frame having the same dimensions as the picture resolution that is selected by said resolution selection control means.

6. A video coding apparatus according to claim 5, further comprising display resolution conversion means for converting resolution of the reconstructed picture of the current frame to a predetermined constant resolution and supplying the reconstructed picture with the predetermined constant resolution to a display unit prepared for monitoring purposes.

7. A video coding apparatus according to claim 1, wherein said resolution selection control means calculates a product of the quantizer step size in the previous frame and the amount of coded data in the previous frame and determines the picture resolution of the current frame by comparing the product with a predetermined threshold.

8. A video coding apparatus according to claim 7, wherein the predetermined threshold is one of a plurality of different threshold values, and said resolution selection control means chooses one threshold value out of the plurality of different values according to the picture resolution of the previous frame and determines the resolution of the current frame by comparing the product with the selected threshold value.

9. A video coding apparatus for performing predictive coding of digital video input signals, comprising:

resolution selection control means for selecting picture resolution to be used in coding of a source picture of a current frame based on coding information in a previous frame, said coding information including quantizer step size, amount of coded data, and buffer occupancy;

coding means for coding the source picture of the current frame with a predictive coding technique, comprising prediction error calculation means for obtaining a prediction error signal of the current frame by calculating difference between the source picture of the current frame and a predicted picture of the current frame, and resolution conversion means coupled to said prediction error calculation means for converting resolution of the prediction error signal to the picture resolution selected by said resolution selection control means;

resolution inverse-conversion means for inversely converting resolution of a decoded prediction error signal of the current frame from the picture resolution selected by said resolution selection control means to the same resolution as the source picture originally has; and picture reconstruction means coupled to said resolution inverse-conversion means for generating a reconstructed picture of the current frame by adding the decoded prediction error signal whose resolution is inversely converted by said resolution inverse-conversion means to the predicted picture of the current frame having the same resolution as the source picture originally has.

* * * * *